(12) United States Patent
Tanaka (10) Patent No.: US 10,363,779 B2
(45) Date of Patent: Jul. 30, 2019

(54) HEAVY DUTY PNEUMATIC TIRE

(71) Applicant: Sumitomo Rubber Industries, Ltd., Kobe-shi, Hyogo (JP)

(72) Inventor: Kaori Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 367 days.

(21) Appl. No.: 15/185,139

(22) Filed: Jun. 17, 2016

(65) Prior Publication Data
US 2017/0008349 A1   Jan. 12, 2017

(30) Foreign Application Priority Data
Jul. 9, 2015 (JP) .................................. 2015-137497

(51) Int. Cl.
*B60C 11/03* (2006.01)
*B60C 11/12* (2006.01)
*B60C 11/04* (2006.01)

(52) U.S. Cl.
CPC ........ *B60C 11/0306* (2013.01); *B60C 11/047* (2013.01); *B60C 11/1218* (2013.01);
(Continued)

(58) Field of Classification Search
CPC ....... B60C 2011/036; B60C 2011/0365; B60C 2011/0376; B60C 2011/039; B60C 11/1218
(Continued)

(56) References Cited

U.S. PATENT DOCUMENTS 4,320,790 A * 3/1982 Corner .................... B60C 11/11
152/209.27
2003/0029537 A1* 2/2003 Iwamura ................. B60C 11/12
152/209.18
(Continued)

FOREIGN PATENT DOCUMENTS

DE 19548733 A1 * 6/1997 ......... B60C 11/0302
EP 0668173 A1 8/1995
(Continued)

OTHER PUBLICATIONS

Machine Translation:JP-2007083771-A; Fujita, Kazuto (Year: 2018).*
(Continued)

*Primary Examiner* — Robert C Dye
*Assistant Examiner* — Kendra Ly
(74) *Attorney, Agent, or Firm* — Birch, Stewart, Kolasch & Birch LLP (57) ABSTRACT

A heavy duty pneumatic tire includes a tread portion provided with a plurality of circumferentially extending main grooves and a plurality of land portions separated by the main grooves. The land portions include a shoulder land portion with a tread edge, a first middle land portion adjacent to the shoulder land portion, and a second middle land portion adjacent to the first middle land portion. The shoulder land portion is formed into a circumferentially continuous rib. The first middle land portion is formed into a row of first middle blocks separated by a plurality of first middle lateral grooves. The second middle land portion is formed into a row of second middle blocks separated by a plurality of second middle lateral grooves. Each first middle block has a circumferential length greater than that of each second middle block.

16 Claims, 8 Drawing Sheets

(52) U.S. Cl.
CPC . *B60C 2011/039* (2013.01); *B60C 2011/0346* (2013.01); *B60C 2011/0365* (2013.01); *B60C 2011/1213* (2013.01); *B60C 2200/06* (2013.01)

(58) Field of Classification Search
USPC .................................. D12/502–603
See application file for complete search history.

(56) References Cited

U.S. PATENT DOCUMENTS

| | | | | |
|---|---|---|---|---|
| 2010/0180997 | A1* | 7/2010 | Shimizu | B60C 11/0306 152/209.18 |
| 2012/0216931 | A1* | 8/2012 | Shiono | B60C 11/0306 152/209.18 |

FOREIGN PATENT DOCUMENTS

| | | | | |
|---|---|---|---|---|
| JP | 8-72508 A | | 3/1996 | |
| JP | 2007083771 A | * | 4/2007 | ......... B60C 11/0318 |
| JP | 2009-234362 A | | 10/2009 | |
| JP | 2009234362 A | * | 10/2009 | |

OTHER PUBLICATIONS

Machine Translation:JP-2009234362-A; Yoshida, Takeshi (Year: 2018).*
Machine Translation: DE-19548733-A1; Gauterin Frank Dr; (Year: 2019).*
Extended European Search Report for European Application No. 16175820.6, dated Dec. 12, 2016.

* cited by examiner

HEAVY DUTY PNEUMATIC TIRE

BACKGROUND ART

Field of the Invention

The present invention relates to heavy duty pneumatic tires, and in particular relates to a heavy duty pneumatic tire capable of suppressing uneven wear.

Description of the Related Art

Japanese Unexamined Patent Application Publication No. 2009-234362 discloses a heavy duty pneumatic tire that includes a wide tread portion provided with a circumferentially and continuously extending shoulder rib, a first middle block row located axially inward of the shoulder rib and a second middle block row located axially inward of the first middle block row. The first middle block row includes blocks and lateral grooves which have the same circumferential length as blocks and lateral grooves of the second middle block row, respectively.

Generally, when heavy duty pneumatic tires are inflated, outer diameters of the tread portions grow. The outer diameter growth tends to occur largely around tread edges on which relatively low hoop effect of the belt layer acts. Thus, conventional heavy duty pneumatic tire tends to deform such that the first middle block row has a larger outer diameter than that of the second middle block row when inflated.

When the blocks and lateral grooves of the first middle block row have the same circumferential length as the blocks and lateral grooves of the second middle blocks respectively, a block occupying ratio in one pitch of the first middle block row reduces as compared with the second middle block row due to inflated deformation as mentioned above. Since the first middle block row as mentioned above has relatively low pattern rigidity, the first middle block row tends to wear earlier than the second middle block row. Note that the above-mentioned one pitch means one of repeated pattern elements including adjacent one block and one lateral groove.

SUMMARY OF THE INVENTION

In view of the above problems in the conventional art, the present invention has an object to provide a heavy duty pneumatic tire capable of suppressing uneven wear of land portions.

According to one aspect of the invention, a heavy duty pneumatic tire including a tread portion provided with a plurality of circumferentially extending main grooves and a plurality of land portions separated by the main grooves. The land portions include a shoulder land portion having a tread edge, a first middle land portion adjacent to the shoulder land portion, and a second middle land portion adjacent to the first middle land portion. The shoulder land portion is formed into a circumferentially continuous rib. The first middle land portion is formed into a row of first middle blocks separated by a plurality of first middle lateral grooves. The second middle land portion is formed into a row of second middle blocks separated by a plurality of second middle lateral grooves. Each first middle block has a circumferential length greater than that of each second middle block.

In another aspect of the invention, a tread width may be equal to or more than 300 mm, and an aspect ratio may be equal to or less than 55%.

In another aspect of the invention, the land portions may include a third middle land portion adjacent to the second middle land portion and a central land portion adjacent to the third middle land portion, and the central land portion may be disposed on a tire equator.

In another aspect of the invention, the third land portion may be provided with a plurality of third middle lateral grooves to form a plurality of third middle blocks, the central land portion may be provided with a plurality of central lateral grooves to form a plurality of central blocks, each central lateral groove may extend along an axial direction of the tire, and each of the first middle lateral grooves, second middle lateral grooves and third middle lateral grooves may incline at an angle with respect to the axial direction of the tire.

In another aspect of the invention, the first middle lateral grooves and the third middle lateral grooves may incline in the same direction, and the second middle lateral grooves may incline in an opposite direction to the first middle lateral grooves and third middle lateral grooves.

In another aspect of the invention, the respective central blocks, first middle blocks, second middle blocks and third middle blocks may have hexagonal ground contact surfaces including a pair of corners that protrude axially both sides, and each ground contact surface may be provided with a zigzag sipe connecting both corners.

DESCRIPTION OF THE PREFERRED EMBODIMENTS

Figure 1:
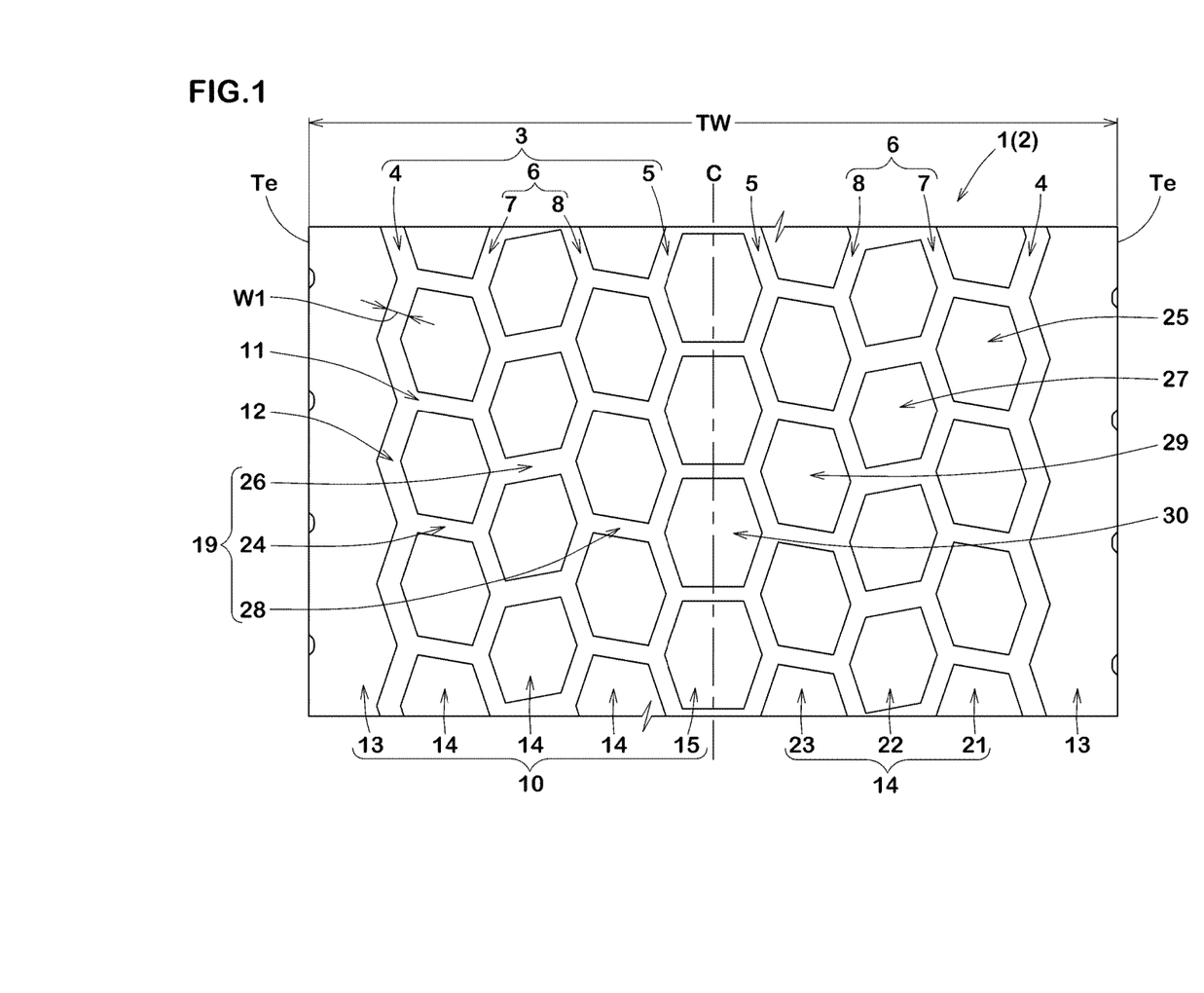
FIG. 1 is a development view of a tread portion of a heavy duty pneumatic tire according to an embodiment of the present invention.

An embodiment of the present invention will be explained below with reference to the accompanying drawings. FIG. 1 illustrates a development view of a tread portion 2 of a heavy duty pneumatic tire 1 according to an embodiment of the present invention. The tire 1 according to the present embodiment, for example, is configured as a wide-tread tire (e.g. "wide single tire") that may replace two conventional dual tires mounted on a single wheel rim.

As illustrated in FIG. 1, the tread portion 2 is provided with a plurality of circumferentially extending main grooves 3.

The main grooves 3, for example, include a shoulder main groove 4 disposed proximate to a tread edge Te, a central main groove 5 disposed proximate to a tire equator C, and at least one middle main groove 6 disposed between the shoulder main groove 4 and the central main groove 5 on each side of the tire equator C.

As used herein, the tread edge Te, in each side of the tire equator C, is defined as the axially outermost edge of the ground contacting patch of the tread portion 2 which occurs under a standard condition with a standard tire load when the camber angle of the tire is set to zero. Here, the standard condition is such that the tire 1 is mounted on a standard wheel rim (not illustrated) with a standard pressure, and is loaded with no tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

In this embodiment, the at least one middle main groove 6, for example, includes a first middle main groove 7 disposed on the side of the shoulder main groove 4 and a second middle main groove 8 disposed on the side of the central main groove 5.

Each main groove 3, for example, is configured as a zigzag shape that includes a first peak 11 protruding axially inwardly and a second peak 12 protruding axially outwardly, and which are arranged alternately in the circumferential direction of the tire.

Preferably, each main groove 3 has a width W1 of from 2.0% to 3.5% of the tread width TW and a depth of from 15 to 25 mm, for example. As used herein, the tread width TW is defined as an axial distance between the tread edges Te and Te of the tire under the standard condition.

The tread portion 2 includes a plurality of land portions 10 separated by the main grooves 3. The land portions 10, for example, include shoulder land portions 13, middle land portions 14 having a plurality of middle blocks 20 separated by middle lateral grooves 19 and a central land portion 15.

Figure 2:
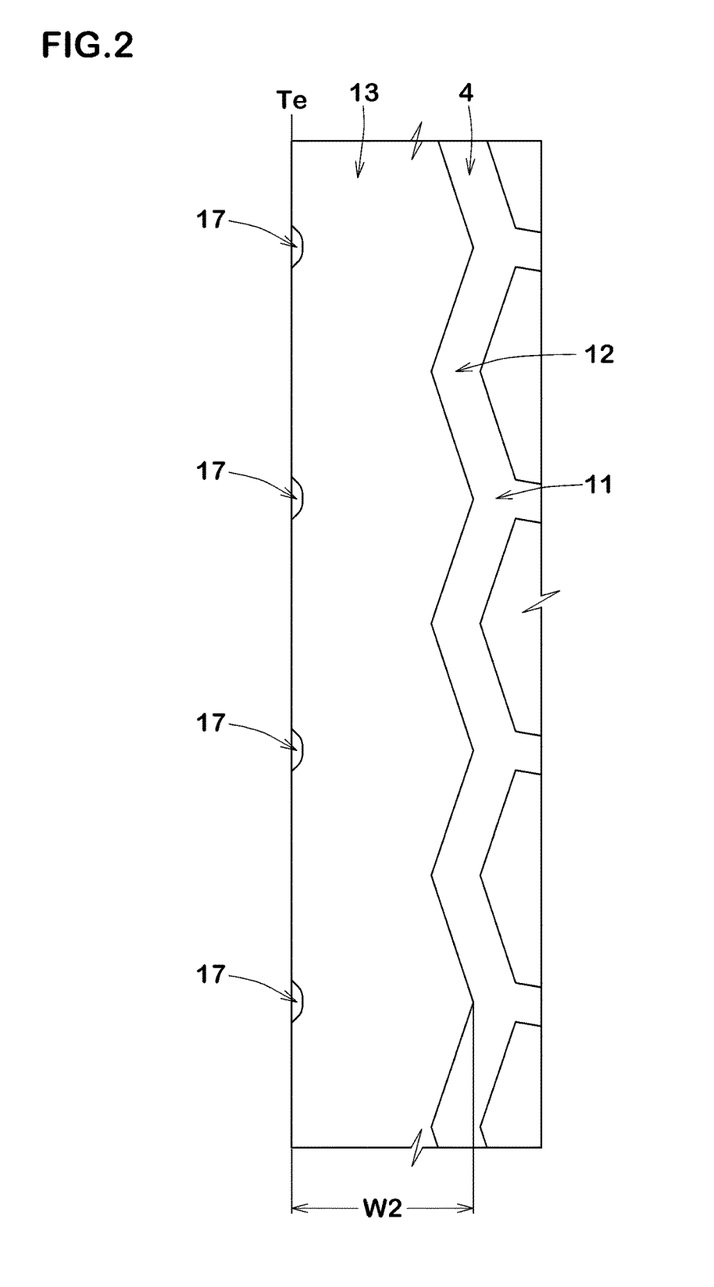
FIG. 2 is an enlarged view of a shoulder land portion of FIG. 1.

FIG. 2 illustrates an enlarged view of one of the shoulder land portions 13. As illustrated in FIG. 2, the shoulder land portion 13 is disposed between the shoulder main groove 4 and the tread edge Te.

The shoulder land portion 13 is configured as a rib that continuously extends in the circumferential direction of the tire. Since the shoulder land portion 13 has high circumferential rigidity, shoulder wear of the tread portion 2 can effectively be suppressed.

The maximum axial width W2 of the shoulder land portion 13 is preferably in a range of 0.08 to 0.15 times the tread width TW, for example in order to improve steering stability as well as wet performance of the tire in good balance.

Figure 3:
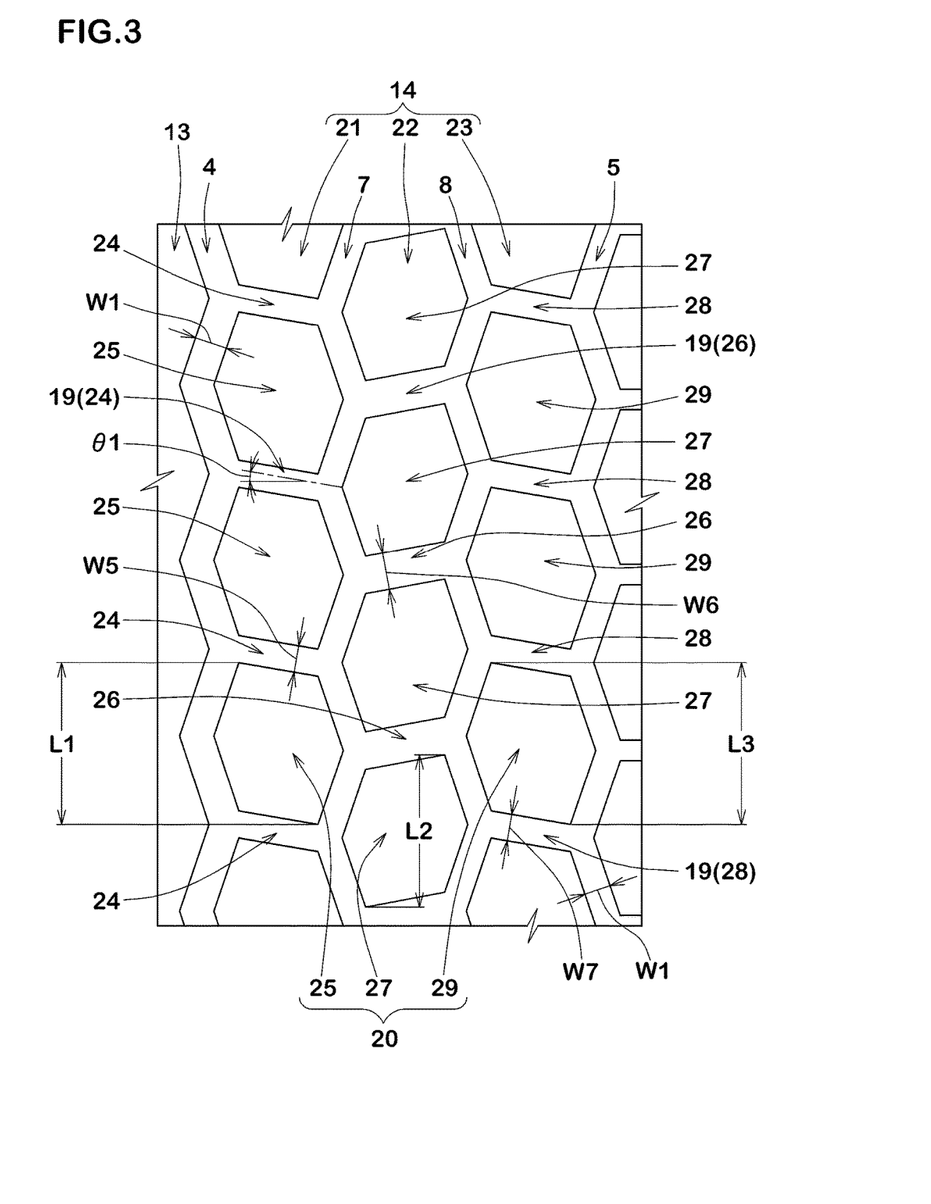
FIG. 3 is an enlarged view of a middle land portion of FIG. 1.

The shoulder land portion 13, for example, is provided with a plurality of recesses 17 on the side of the tread edge Te. The recesses 17 may be useful to improve wandering performance, FIG. 3 illustrates an enlarged view of middle land portions 14. As illustrated in FIG. 3, the middle land portions 14 are disposed between the shoulder main groove 4 and the central main groove 5. In this embodiment, by providing the first middle main groove 7 and the second middle main groove 8 between the shoulder main groove 4 and the central main groove 5, a first middle land portion 21, a second middle land portion 22 and a third middle land portion 23 are separated.

The first middle land portion 21 is disposed between the shoulder main groove 4 and the first middle main groove 7. The first middle land portion 21 is configured as a row of blocks where a plurality of first middle blocks 25 divided by first middle lateral grooves 24 are arranged in the circumferential direction of the tire.

The second middle land portion 22 is disposed between the first middle main groove 7 and the second middle main groove 8. The second middle land portion 22 is configured as a row of blocks where a plurality of second middle blocks 27 divided by second middle lateral grooves 26 are arranged in the circumferential direction of the tire.

The third middle land portion 23 is disposed between the second middle main groove 8 and the central main groove 5. The third middle land portion 23 is configured as a row of blocks where a plurality of third middle blocks 29 divided by third middle lateral grooves 28 are arranged in the circumferential direction of the tire.

The middle land portions 14 formed as rows of blocks may be useful to improve wet performance.

Each middle block 20, for example, includes a hexagonal ground contact surface including a pair of corners that protrude axially both sides. The middle block 20 elastically deforms so as to expand its axial width when a circumferential leading edge thereof comes into contact with the ground. This makes it possible to suppress heel and toe wear of the middle block 20 by absorbing impact acting on the edge.

Each first middle block 25 has a larger circumferential length L1 than that of each second middle block 27. Thus, even when outer diameter growth occurs such that the first middle land portion 21 has a larger diameter than that of the second middle land portion 22 at the time of inflated deformation, a block occupying ratio in each pitch of the first middle land portion 21 would approximate a block occupying ratio of the second middle land portion 22. Therefore, uneven wear of the first middle land portion 21 can effectively be suppressed.

In order to obtain the above effects while ensuring wet performance of the tire, the circumferential lengths L1 of the first middle blocks 25 are preferably in a range of not less than 1.03 times, more preferably not less than 1.05 times, and preferably not more than 1.12 times, more preferably not more than 1.10 times of the circumferential lengths L2 of the second middle blocks 27.

Regarding the block occupying ratio, i.e., a ratio of a circumferential block length to a circumferential pitch length, it is preferable that the first middle blocks 25 approximate the second middle blocks 27 under the standard state. Here, the pitch length mentioned above is a total circumferential length of adjacent one block and one lateral groove.

Specifically, in the standard condition, a ratio R1/R2 is preferably in a range of from 0.95 to 1.10, more preferably in a range of from 1.00 to 1.06, wherein "R1" is a block occupying ratio of the circumferential length L1 of one of the first middle blocks 25 to the pitch length, and "R2" is a block occupying ratio of the circumferential length L2 of one of the second middle blocks 25 to the pitch length.

Preferably, the second middle blocks 27 have circumferential lengths L2 equal to or less than the circumferential lengths L3 of the third middle blocks 29. Specifically, the circumferential lengths L2 of the second middle blocks 27 are preferably in a range of not more than 1.0 times, more preferably not more than 0.97 times, and preferably in a range of not less than 0.90 times, more preferably not more than 0.93 times of the circumferential lengths L3 of the third middle blocks 29 in order to be progressed wear on each middle blocks 20 uniformly.

Preferably, each middle lateral grooves 19, for example, inclines at an angle with respect to the axial direction of the tire. These middle lateral grooves 19 may be useful to prevent sideslip on wet conditions by generating lateral frictional force at groove edges.

In this embodiment, each of the first middle lateral grooves 24 and third middle lateral grooves 28 inclines in the same direction (e.g. upward left) with one another. Furthermore, each of the second middle lateral grooves 26 inclines in an opposite direction (e.g. downward left) to each of the first middle lateral grooves 24 and third middle lateral grooves 28. With the structure of these middle lateral grooves 19, lateral forces generated by the respective lateral groove on the contact patch would be offset suitably, and thus straight traveling ability of the tire can be improved. Furthermore, in such a configuration of the middle lateral grooves 19, pumping noise generated by lateral grooves 19 would sound as a white noise.

Each middle lateral grooves 19, for example, inclines at an angle θ1 of from 5 to 20 degrees with respect to the axial direction of the tire. The tire in accordance with the present embodiment may improve drainage property by guiding water introduced in the lateral grooves smoothly toward the main grooves when traveling on wet condition.

In this embodiment, each middle lateral groove 19, for example, has a different width with one another.

For instance, the water that is pushed away by the shoulder land portion 13 and the first middle land portion 21 tends to flow axially inwardly easily since the shoulder land portion 13 is a continuous rib. Thus, a width W6 of the second middle lateral grooves 26 is preferably greater than widths W5 and W7 of the first middle lateral grooves 24 and the third middle lateral grooves 28, respectively. This configuration may further improve the wet performance.

The width W6 of the second middle lateral grooves 26 is preferably in a range of not less than 1.25 times, more preferably not less than 1.30 times, and preferably in a range of not more than 1.40 times, more preferably not more than 1.35 times of the width W5 of the first middle lateral grooves 24 in order to improve the steering stability and wet performance in good balance.

The width W7 of the third middle lateral grooves 28 is preferably greater than the width W5 of the first middle lateral grooves 24. The width W7 of the third middle lateral grooves 28 is preferably in a range of from 1.03 to 1.08 times the width W5 of the first middle lateral grooves 24. The third middle lateral grooves 28 having such a width may be useful to further improve drainage performance of the tire.

Preferably, each middle lateral groove 19, for example, has a width of from 1.0 to 1.4 times the width W1 of the central main groove 5. The middle lateral grooves 19 having such a width may further improve the wet performance while ensuring wear resistance.

Figure 4:
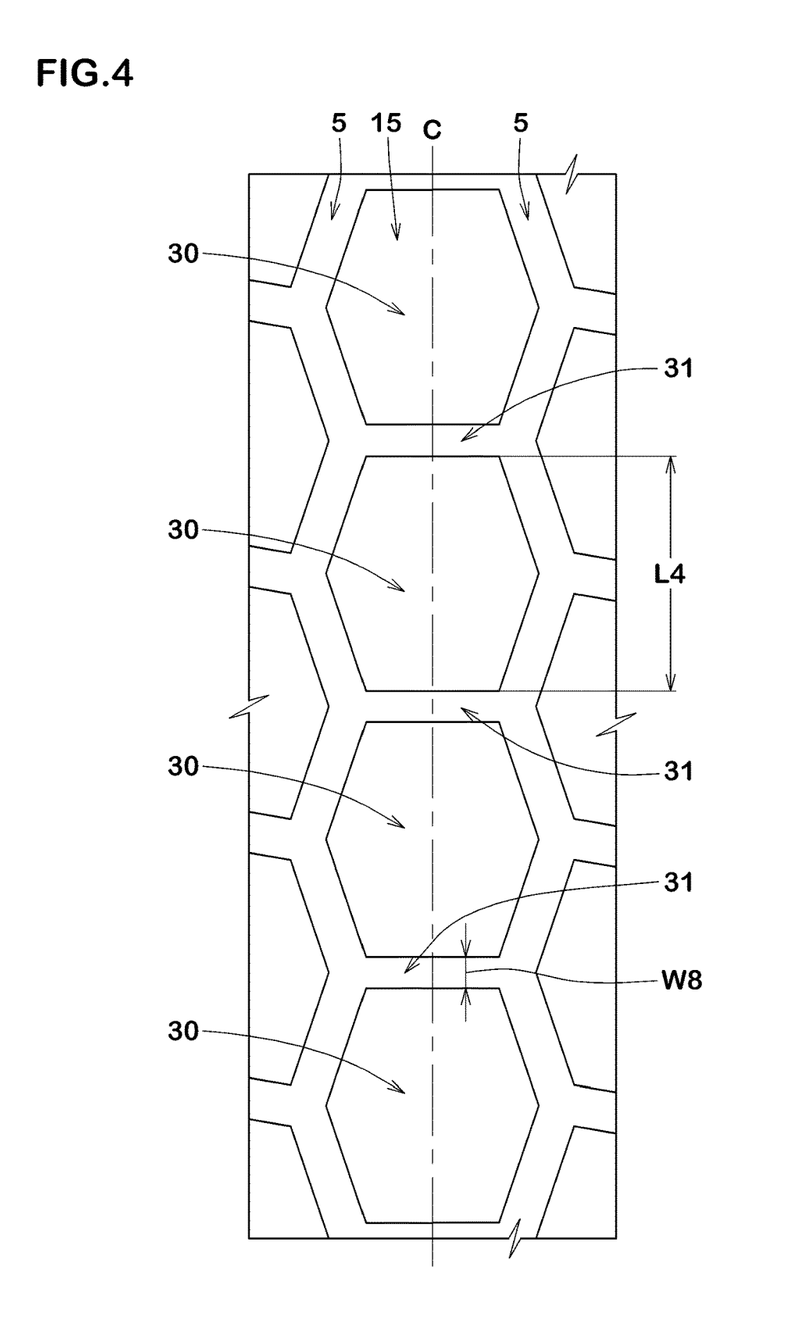
FIG. 4 is an enlarged view of a central land portion of FIG. 1.

FIG. 4 illustrates an enlarged view of the central land portion 15. As illustrated in FIG. 4, the central land portion 15 is disposed on the tire equator C between the central main grooves 5 and 5 arranged.

The central land portion 15 is configured as a row of blocks where a plurality of central blocks 30 divided by central lateral grooves 31 are arranged in the circumferential direction of the tire.

The central blocks 30, for example, include hexagonal ground contact surfaces including a pair of corners that protrude axially both sides. The central blocks 30 having such a ground contact surface may be useful to suppress heel and toe wear like the middle blocks.

Generally, the central blocks 30 may receive large ground contact pressure as compared with the third middle blocks 29. Thus, a circumferential length L4 of the central blocks 30 is preferably equal to or more than the circumferential length L3 of the third middle blocks 29.

Specifically, the length L4 of the central blocks 30 is preferably in a range of not less than 1.00 times, more preferably not less than 1.03 times, and preferably in a range of not more than 1.10 times, more preferably not more than 1.07 times the length L3 of the third middle blocks 29. With this, it is possible to approximate the progress of wear on the central blocks to that of the third middle blocks in order to suppress uneven wear of the tread portion 2.

Preferably, the central lateral grooves 31, for example, may extend along the axial direction of the tire to increase traction by generating circumferential frictional force on wet conditions.

Preferably, a width W8 of the central lateral grooves 31 is less than the width W7 of the third middle lateral grooves 28. Specifically, the widths W8 of the central lateral grooves 31 is preferably in a range of not more than 0.80 times, more preferably not more than 0.75 times, and preferably not less than 0.65 times, more preferably not less than 0.70 times the width W7 of the third middle lateral grooves 28 in order to further improve uneven wear resistance and wet performance in good balance.

As illustrated in FIG. 1, the tire 1 in accordance with the present embodiment preferably has the tread width TW equal to or more than 300 mm and an aspect ratio equal to or less than 55%, as a wide single tire. Here, the aspect ratio is a ratio of a tire sectional height to a tire maximum width in a cross-sectional view of the tire under the standard condition.

Figure 5:
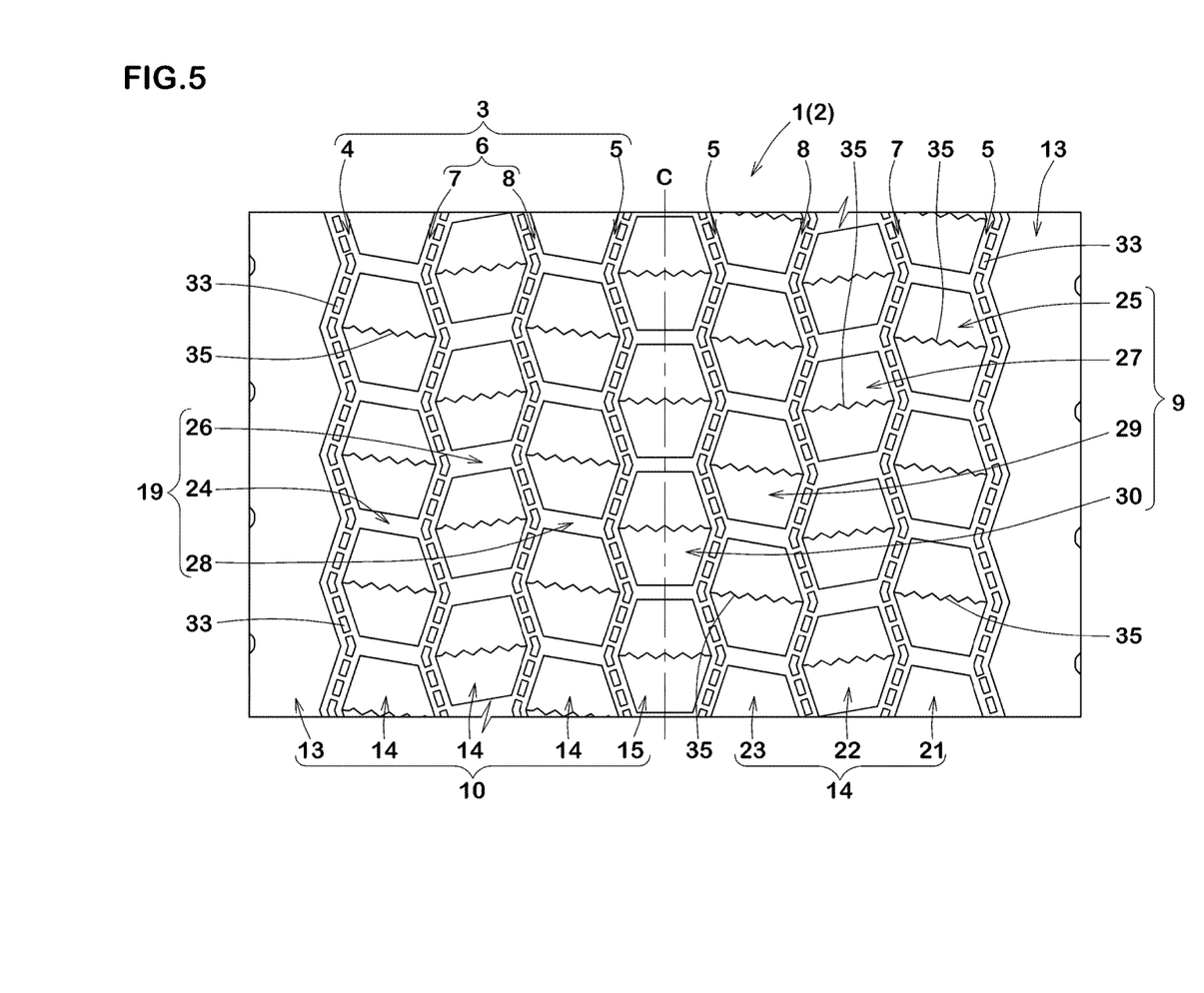
FIG. 5 is a development view of a tread portion of a heavy duty pneumatic tire according to another embodiment of the present invention.

FIG. 5 illustrates a development view of the tread portion 2 according to another embodiment of the present invention. In FIG. 5, note that the same elements described in the above are denoted by the same reference numbers.

As illustrated in FIG. 5, each main groove 3 is provided with projections 33 on its bottom. The projections 33, for example, have a vertically long rectangular shape in a plan view of the tread portion and are apart from one another in the circumferential direction of the tire. These projections 33 can prevent that the main grooves 3 pinch stones.

In this embodiment, a ground contact surface of each block 9 (i.e., blocks 25, 27, 29 and 30) is provided with a sipe 35. The sipe 35 may reduce distortion of the ground contact surface when the block comes into contact with the ground, and thus can suppress the uneven wear. Furthermore, the sipe 35 may be useful to improve wet performance.

Figure 6:
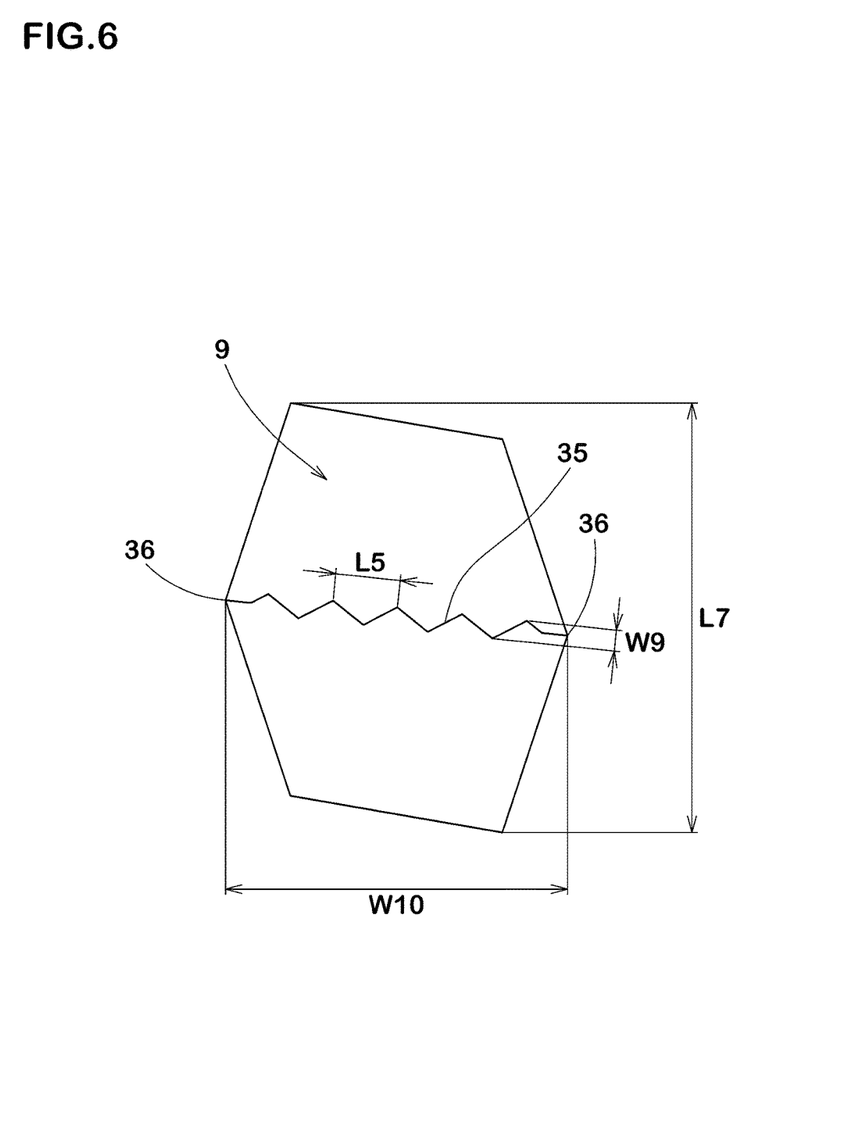
FIG. 6 is an enlarged view of a block of FIG. 5.

FIG. 6 illustrates an enlarged view of one block 9 to explain the sipe 35. As illustrated in FIG. 6, the sipe 35, for example, extends in a zigzag shape so as to connect both corners 36 and 36 of the hexagonal ground contact surface which protrude axially both sides. The sipe walls of the sipe 35 can be engaged with each other when a ground contact pressure acts on the ground contact surface. Thus, block pieces divided by the sipe 35 can be integrated to maintain block rigidity. Furthermore, since such a zigzag sipe 35 may provide long length as compared with a straight shape, the wet performance can also be improved.

In order to improve wet performance while ensuring block rigidity, amplitude W9 of the sipe 35 is preferably in a range of not less tan 1.5 mm, more preferably not less than 3.5 mm, and preferably not more than 10.0 mm, more preferably not more than 5.0 mm.

From the same point of view, pitches L5 of the sipes 35 is preferably in a range of not less than 0.6 times, more preferably not less than 2.0 times, and preferably not more than 10.0 times, more preferably not more than 3.5 times the amplitude W9.

Figure 7:
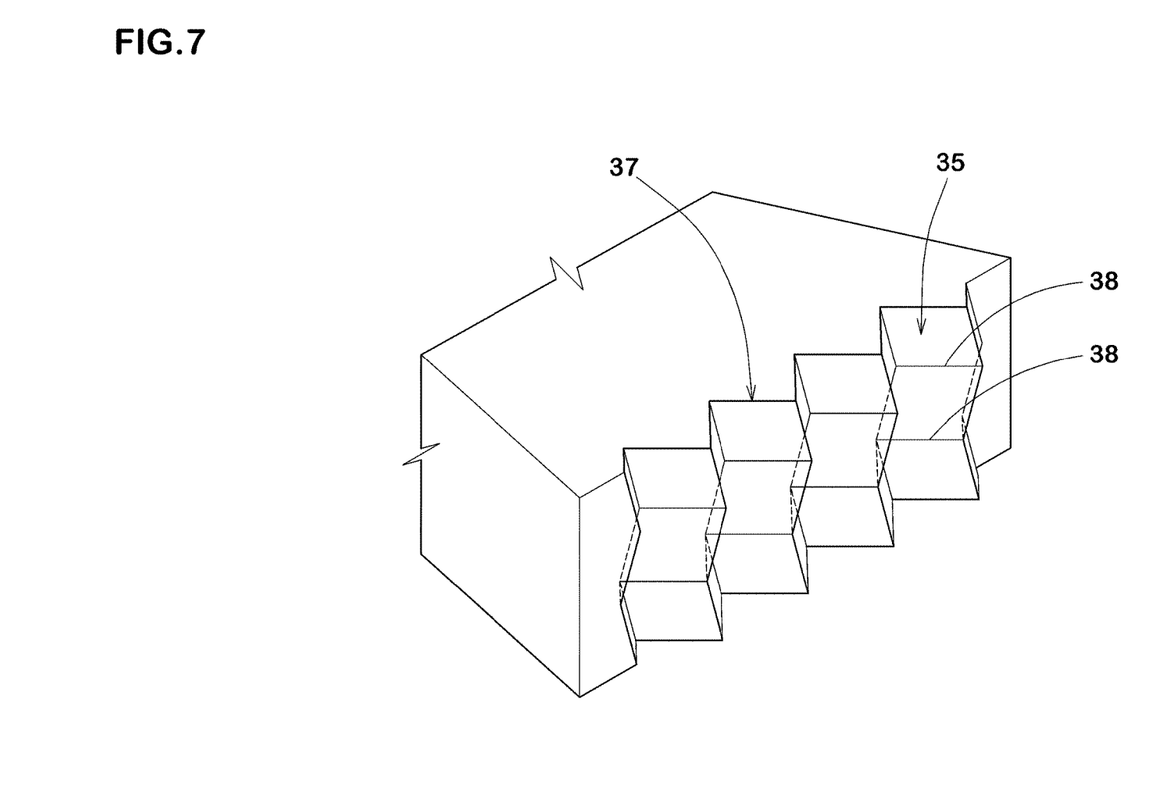
FIG. 7 is a perspective view illustrating a sipe wall of FIG. 6.

FIG. 7 illustrates a perspective view of a sipe wall of the sipe 35. As illustrated in FIG. 7, the sipe wall of the sipe 35 is configured as so-called Miura-ori shape. That is, the sipe 35 in accordance with the present embodiment includes a zigzag opening shape 37 in a plane parallel to the ground contact surface and which oscillates in the longitudinal direction of the sipe toward a bottom of the sipe while keeping the zigzag opening shape 37. Such a sipe 35 would be useful to firmly engage the sipe walls to further maintain block rigidity.

In order to further improve the above mentioned effect, the sipe 35 preferably includes at least two turning portions 38 in a depth direction of the sipe.

Figure 8:
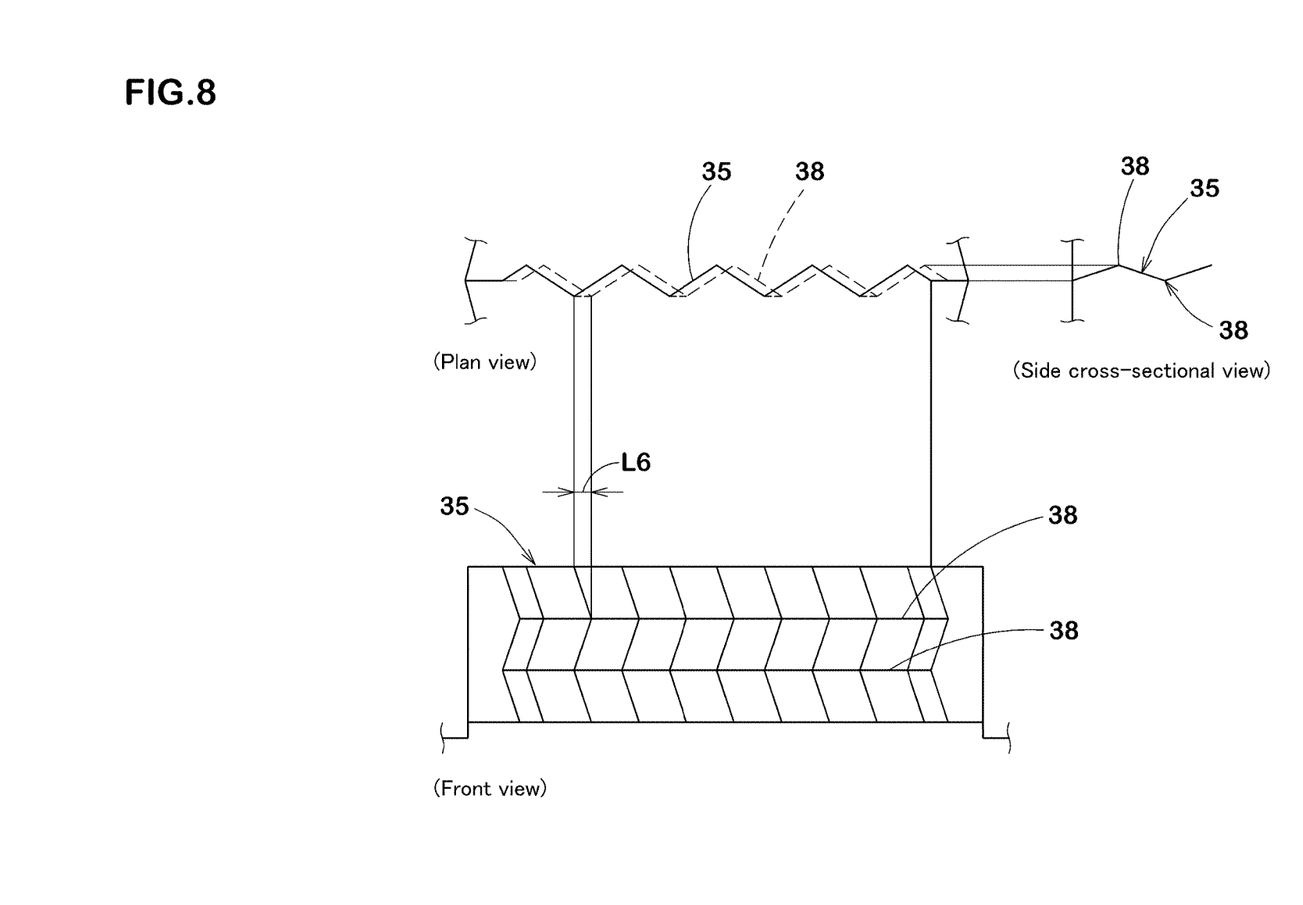
FIG. 8 is a trihedral figure of the sipe of FIG. 5.

FIG. 8 illustrates a trihedral figure of the sipe 35. As illustrated in FIG. 8, an amplitude L6 of the sipe 35 in the sipe longitudinal direction is preferably in a range of not less than 0.5 mm, more preferably not less than 1.5 mm, and preferably not more than 4.0 mm, more preferably not more than 3.0 mm.

As illustrated in FIG. 6, when the sipe 35 is provided on the ground contact surface of the block 9, a ratio L7/W10 of the circumferential length L7 of the block 9 to the axial width W10 of the block 9 is in a range of not less than 0.5, more preferably not less than 0.8, and preferably not more than 2.0, more preferably not more than 1.5 in order to improve wet performance while maintaining wear resistance of the block.

While the particularly preferable embodiments in accordance with the present invention have been described in detail, the present invention is not limited to the illustrated embodiments, but can be modified and carried out in various aspects.

EXAMPLE

Heavy duty pneumatic tires 445/50R22.5 having a basic tread pattern illustrated in FIG. 1 or FIG. 5 were manufactured based on the details shown in Table 1. As for the comparative examples, tires having a circumferential length of the first middle block equal to or less than a circumferential length of the second middle block. Then, wear resistance and wet performance of each test tire was tested. The common specification and the test method are as follows.
Rim: 22.5×14.0
Internal pressure: 830 kPa
Test vehicle: 2-DD type truck having load capacity of 10 t (with a 50% load on a middle portion of its platform)
Tire mounting location: All wheels
Uneven Wear Resistance Test:
  After the test vehicle traveled for a certain distance, the wear difference between the first middle land portion and the second middle land portion was measured. The results are indicated using an index based on Ref. 1 being 100. The smaller the value, the better the performance is.
Wet Performance Test:
  On an asphalt road covered with 5 mm depth water, the time required for the test truck to run 10 meters was measured after the second gear of the truck was connected to the engine of 1500 rpm using the clutch. The results are indicated in Table 1 using an index based on Ref. 1 being 100. The smaller the value, the better the wet performance is.

The test results are shown in Table 1. From the test results, it is confirmed that the example heavy duty pneumatic tires exhibit excellent uneven wear resistance while maintaining wet performance.

TABLE 1

|  | Ref. 1 | Ref. 2 | Ref. 3 | Ref. 4 | Ex. 1 | Ex. 2 | Ex. 3 | Ex. 4 | Ex. 5 |
|---|---|---|---|---|---|---|---|---|---|
| Tread pattern | FIG. 1 | FIG. 1 | FIG. 5 | FIG. 5 | FIG. 1 | FIG. 1 | FIG. 1 | FIG. 1 | FIG. 1 |
| Second middle lateral groove width W2/first middle lateral groove width W1 | 1.00 | 0.82 | 1.00 | 0.82 | 1.34 | 1.14 | 1.26 | 1.69 | 1.97 |
| First middle block length L1/second middle block length L2 | 1.00 | 0.95 | 1.00 | 0.95 | 1.07 | 1.03 | 1.05 | 1.10 | 1.12 |
| Second middle block length L2/third middle block length L3 | 0.95 | 0.95 | 0.95 | 0.95 | 0.95 | 0.95 | 0.95 | 0.95 | 0.95 |
| Central block length L4/third middle block length L3 | 1.05 | 1.05 | 1.05 | 1.05 | 1.05 | 1.05 | 1.05 | 1.05 | 1.05 |
| Middle lateral groove angle θ1 (deg.) | 10 | 10 | 10 | 10 | 10 | 10 | 10 | 10 | 10 |
| Uneven wear resistance (index) | 100 | 125 | 102 | 128 | 73 | 79 | 75 | 69 | 68 |
| Wet performance (index) | 100 | 100 | 88 | 89 | 98 | 98 | 98 | 99 | 100 |

|  | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| Second middle lateral groove width W2/first middle lateral groove width W1 | 1.34 | 1.34 | 1.34 | 1.34 | 1.34 | 1.34 | 1.34 | 1.34 | 1.34 |
| First middle block length L1/second middle block length L2 | 1.07 | 1.07 | 1.07 | 1.07 | 1.07 | 1.07 | 1.07 | 1.07 | 1.07 |
| Second middle block length L2/third middle block length L3 | 0.9 | 0.93 | 0.97 | 1.00 | 0.95 | 0.95 | 0.95 | 0.95 | 0.95 |
| Central block length L4/third middle block length L3 | 1.05 | 1.05 | 1.05 | 1.05 | 1.00 | 1.03 | 1.07 | 1.10 | 1.05 |
| Middle lateral groove angle θ1 (deg.) | 10 | 10 | 10 | 10 | 10 | 10 | 10 | 10 | 5 |
| Uneven wear resistance (index) | 75 | 73 | 76 | 78 | 77 | 74 | 75 | 79 | 73 |
| Wet performance (index) | 99 | 98 | 98 | 100 | 98 | 98 | 99 | 100 | 101 |

TABLE 1-continued

|  | Ex. 15 | Ex. 16 | Ex. 17 | Ex. 18 | Ex. 19 | Ex. 20 | Ex. 21 |
|---|---|---|---|---|---|---|---|
| Tread pattern | FIG. 1 | FIG. 1 | FIG. 5 | FIG. 5 | FIG. 5 | FIG. 5 | FIG. 5 |
| Second middle lateral groove width W2/first middle lateral groove width W1 | 1.34 | 1.34 | 1.34 | 1.14 | 1.26 | 1.69 | 1.97 |
| First middle block length L1/second middle block length L2 | 1.07 | 1.07 | 1.07 | 1.03 | 1.05 | 1.10 | 1.12 |
| Second middle block length L2/third middle block length L3 | 0.95 | 0.95 | 0.95 | 0.95 | 0.95 | 0.95 | 0.95 |
| Central block length L4/third middle block length L3 | 1.05 | 1.05 | 1.05 | 1.05 | 1.05 | 1.05 | 1.05 |
| Middle lateral groove angle θ1 (deg.) | 15 | 20 | 10 | 10 | 10 | 10 | 10 |
| Uneven wear resistance (index) | 78 | 82 | 75 | 81 | 77 | 71 | 70 |
| Wet performance (index) | 95 | 94 | 88 | 88 | 88 | 80 | 90 |

What is claimed is:

1. A heavy duty pneumatic tire comprising:
a tread portion provided with a plurality of circumferentially extending main grooves so that the tread portion consists of nine land portions separated by the main grooves;
the nine land portions comprising a shoulder land portion having a tread edge, a first middle land portion adjacent to the shoulder land portion, a second middle land portion adjacent to the first middle land portion, and a third middle land portion adjacent to the second middle land portion;
the shoulder land portion being formed into a circumferentially continuous rib;
the first middle land portion being formed into a row of first middle blocks separated by a plurality of first middle lateral grooves;
the second middle land portion being formed into a row of second middle blocks separated by a plurality of second middle lateral grooves;
each first middle block having a circumferential length greater than that of each second middle block;
the third land portion being provided with a plurality of third middle lateral grooves to form a plurality of third middle blocks, and
widths W6 of the plurality of second middle lateral grooves being greater than widths W5 and W7 of the plurality of first middle lateral grooves and the plurality of third middle lateral grooves, respectively.

2. The heavy duty pneumatic tire according to claim 1, wherein a tread width is equal to or more than 300 mm, and an aspect ratio is equal to or less than 55%.

3. The heavy duty pneumatic tire according to claim 1, wherein the nine land portions further comprise a central land portion adjacent to the third middle land portion, and the central land portion is disposed on a tire equator.

4. The heavy duty pneumatic tire according to claim 3, wherein
the central land portion is provided with a plurality of central lateral grooves to form a plurality of central blocks,
each central lateral groove extends in parallel with an axial direction of the tire, and
each of the first middle lateral grooves, second middle lateral grooves and third middle lateral grooves inclines at an angle with respect to the axial direction of the tire.

5. The heavy duty pneumatic tire according to claim 4, wherein
the plurality of first middle lateral grooves and the plurality of third middle lateral grooves incline in the same direction, and
the plurality of second middle lateral grooves incline in an opposite direction to the plurality of first middle lateral grooves and the plurality of third middle lateral grooves.

6. The heavy duty pneumatic tire according to claim 4, wherein the respective central blocks, first middle blocks, second middle blocks and third middle blocks have hexagonal ground contact surfaces comprising a pair of corners that protrude axially both sides, and each ground contact surface is provided with a zigzag sipe connecting the pair of corners.

7. The heavy duty pneumatic tire according to claim 1, wherein circumferential lengths L1 of the plurality of first middle blocks are in a range of from 1.03 to 1.12 of circumferential lengths L2 of the plurality of second middle blocks.

8. The heavy duty pneumatic tire according to claim 1, wherein the widths W6 of the plurality of second middle lateral grooves are in a range of from 1.25 to 1.40 times of the widths W5 of the plurality of first middle lateral grooves.

9. The heavy duty pneumatic tire according to claim 8, wherein the widths W7 of the plurality of third middle lateral grooves are greater than the widths W5 of the plurality of first middle lateral grooves.

10. The heavy duty pneumatic tire according to claim 9, wherein the widths W7 of the plurality of third middle lateral grooves are in a range of from 1.03 to 1.08 times the widths W5 of the plurality of first middle lateral grooves.

11. The heavy duty pneumatic tire according to claim 1, wherein the widths W7 of the plurality of third middle lateral grooves are greater than the widths W5 of the plurality of first middle lateral grooves.

12. The heavy duty pneumatic tire according to claim 11, wherein the widths W7 of the plurality of third middle lateral grooves are in a range of from 1.03 to 1.08 times the widths W5 of the plurality of first middle lateral grooves.

13. The heavy duty pneumatic tire according to claim 1, wherein
the nine land portions further comprise a central land portion adjacent to the third middle land portion,
the central land portion is provided with a plurality of central lateral grooves to form a plurality of central blocks, and
circumferential lengths L4 of the plurality of central blocks are equal to or more than circumferential lengths L3 of the plurality of third middle blocks.

14. The heavy duty pneumatic tire according to claim 1, wherein
each of the first middle blocks and the second middle blocks are provided with a zigzag sipe,
the zigzag sipe includes a zigzag opening shape in a plane parallel to a ground contact surface of the block and oscillating in a longitudinal direction of the sipe toward a bottom of the zigzag sipe so as to include at least two turning portions while keeping the zigzag opening shape, and an amplitude L6 of the zigzag sipe in the longitudinal direction of the sipe is in a range of from 0.5 to 4.0 mm.

15. A heavy duty pneumatic tire comprising:

a tread portion provided with a plurality of circumferentially extending main grooves so that the tread portion consists of nine land portions separated by the main grooves;

the nine land portions comprising a shoulder land portion having a tread edge, a first middle land portion adjacent to the shoulder land portion, a second middle land portion adjacent to the first middle land portion, and a third middle land portion adjacent to the second middle land portion;

the shoulder land portion being formed into a circumferentially continuous rib;

the first middle land portion being formed into a row of first middle blocks separated by a plurality of first middle lateral grooves;

the second middle land portion being formed into a row of second middle blocks separated by a plurality of second middle lateral grooves;

each first middle block having a circumferential length greater than that of each second middle block;

the third land portion being provided with a plurality of third middle lateral grooves to form a plurality of third middle blocks, and widths W7 of the plurality of third middle lateral grooves being greater than widths W5 of the plurality of first middle lateral grooves.

16. A heavy duty pneumatic tire comprising:

a tread portion provided with a plurality of circumferentially extending main grooves so that the tread portion consists of nine land portions separated by the main grooves;

the nine land portions comprising a shoulder land portion having a tread edge, a first middle land portion adjacent to the shoulder land portion, a second middle land portion adjacent to the first middle land portion, a third middle land portion adjacent to the second middle land portion, and a central land portion adjacent to the third middle land portion;

the shoulder land portion being formed into a circumferentially continuous rib;

the first middle land portion being formed into a row of first middle blocks separated by a plurality of first middle lateral grooves;

the second middle land portion being formed into a row of second middle blocks separated by a plurality of second middle lateral grooves;

each first middle block having a circumferential length greater than that of each second middle block;

the third land portion being provided with a plurality of third middle lateral grooves to form a plurality of third middle blocks;

the central land portion being provided with a plurality of central lateral grooves to form a plurality of central blocks, and circumferential lengths L4 of the plurality of central blocks being equal to or more than circumferential lengths L3 of the plurality of third middle blocks.

* * * * *